No. 894,216. PATENTED JULY 28, 1908.
D. G. KITZMILLER.
LEAK STOPPER FOR HOSE.
APPLICATION FILED OCT. 18, 1907.
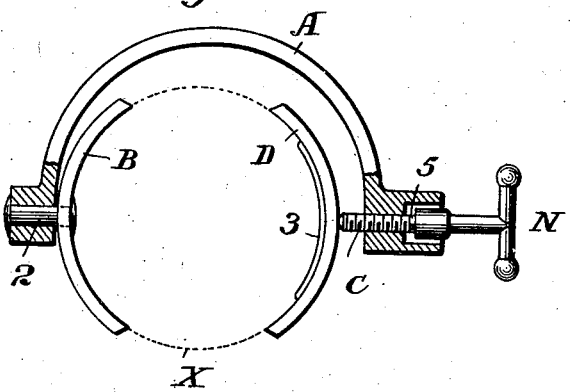
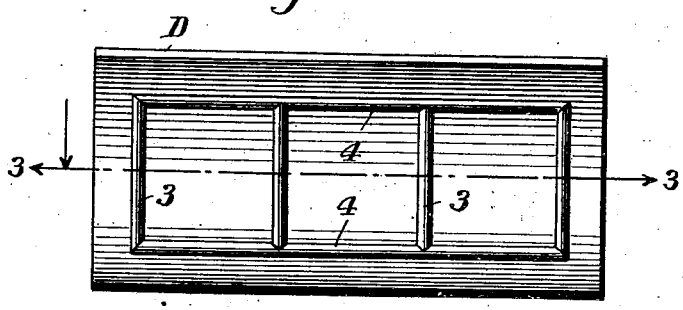
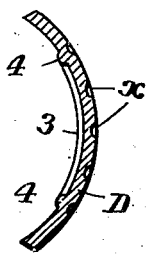
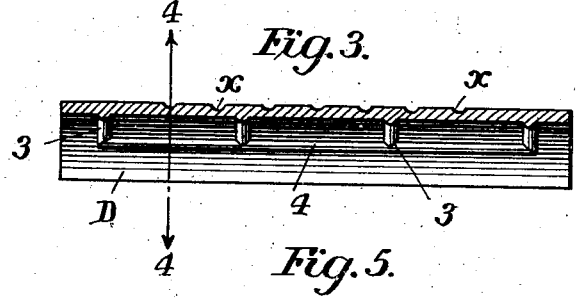
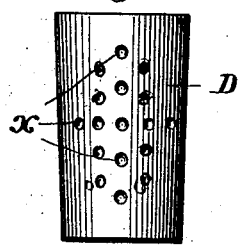
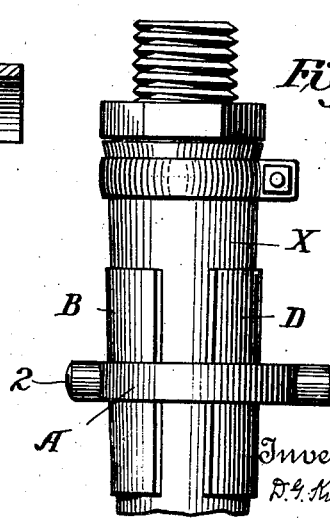
Witnesses
J. G. Hinkel
J. J. McCarthy
Inventor
D. G. Kitzmiller
by Fisher, Freeman, Watson & Coit,
Attorneys

UNITED STATES PATENT OFFICE.

DIXON G. KITZMILLER, OF HARRISBURG, PENNSYLVANIA.

LEAK-STOPPER FOR HOSE.

No. 894,216.

Specification of Letters Patent.

Patented July 28, 1908.

Application filed October 18, 1907. Serial No. 398,073.

*To all whom it may concern:*

Be it known that I, DIXON G. KITZMILLER, a citizen of the United States, residing at Harrisburg, in the county of Dauphin and State of Pennsylvania, have invented certain new and useful Improvements in Leak-Stoppers for Hose, of which the following is a specification.

My invention has for its object to avoid the expense and delays which result from the fracture of flexible hose and more especially of the hose of air-brakes upon cars. A break of this character when occurring in connection with a train will at once cause the arrest of the train, it sometimes requires from fifteen minutes to an hour to detach the hose section and replace it, and the train where the accident occurs is not only delayed but frequently other following trains are correspondingly delayed, or when the break occurs in the railroad yard the arrest of a train may interfere with sending out a number of other trains.

My invention consists in devices, a number of which may be carried with each train, whereby in case of the fracture of a hose the leak may be stopped in a few minutes and the train used until an opportunity occurs to substitute a new hose for that injured, and to this end the said device consists of a yoke carrying a clamp plate and a screw together with a loose plate adapted to be clamped against the hose by the screw, as fully set forth hereinafter and as illustrated in the accompanying drawing, in which:

Figure 1 is a side view in part section of my device; Fig. 2 an inside face view of the loose clamp plate; Fig. 3 a section on the line 3—3, Fig. 2; Fig. 4 a section on the line 4—4, Fig. 3; Fig. 5 a view showing a clamp plate of different form; and Fig. 6 a view illustrating the device applied to the hose section of a brake device.

The device consists essentially of a yoke A, a curved plate B adapted to the contour of the hose and carried by the yoke A, a set screw C carried at the opposite end of the yoke, and a second curved plate D also adapted to the contour of the hose but loose and having one or more sockets $x$ into which the end of the set screw may enter when the parts are in position upon the hose X, which, as shown, is a hose of one section of an air-brake device. The plate B is secured to the yoke A by a pivot 2 so that the plate may swing and adapt itself to its position upon the hose X, and the plate D is a free plate in order that it may be applied in any desired position to the hose so as to swing upon its support and so as to properly cover the break in the hose, after which it is clamped against the hose and the latter is clamped between the two plates by properly turning the set screw C. Preferably there are a series of sockets $x$ extending longitudinally and transversely at the outer side of the plate D, whereby the plate after being adjusted in any desired position may be securely held by introducing the end of the screw into one of the sockets, any possible slipping in any direction being thereby prevented.

To effectually seal the opening in the hose the inside of the plate D is provided with ribs 3, 4, so arranged as to form one or more panels and the plate D is so applied, if possible, that the opening or break in the hose will come within the outline of one of these panels, the ribs being forced into the surface of the hose. These ribs may be arranged in any suitable manner.

In some classes of devices where the hose is secured to a fixture of any kind it is expanded slightly at the detached end. This is especially the case in connection with the section of an air-brake hose, as shown in Fig. 6, and I therefore in some cases provide the device with one or more loose clamping plates D, and one of said plates is slightly tapered or wider at one end than at the other, as shown in Fig. 5, so as to attach it to the conical portion of the hose in case the break should occur at this point.

It will be evident that in the use of the described device after applying the plate B to the hose against the side opposite that where the break has occurred, the yoke extending over the hose, the other plate D may be applied in any desired position so as to cover the break and, being a loose plate, there is no difficulty in adjusting it as circumstances may dictate so as to secure the best results, the clamping then being effected by turning the screw C.

In order to prevent the device from being tampered with or detached by unauthorized persons, the screw C is preferably provided with an angular head 5 which may be fitted with a suitable detachable key N, carried by the conductor or brakeman or other authorized person.

Without limiting myself to the precise construction and arrangement of parts shown and described, I claim:

1. The combination in a leak stopper for hose of a yoke, a curved plate pivotally carried thereby and adapted to the contour of the hose, a second curved plate also adapted to the contour of the hose and provided with a plurality of external sockets, and a set screw carried by the yoke in position to bear in either of the sockets of the second plate.

2. The combination in a leak stopper, of a yoke and two curved plates and pins for supporting them at opposite ends of the yoke so as to oscillate freely, one of said plates having at the inner face ribs forming a panel and at the outside a plurality of sockets for the purpose set forth.

In testimony whereof I affix my signature in presence of two witnesses.

DIXON G. KITZMILLER.

Witnesses:
A. J. BECK,
HOWARD E. GENSLER.